T. H. MARCOTT.
BREAD BOARD.
APPLICATION FILED AUG. 27, 1914.
1,159,695.
Patented Nov. 9, 1915.
2 SHEETS—SHEET 2.
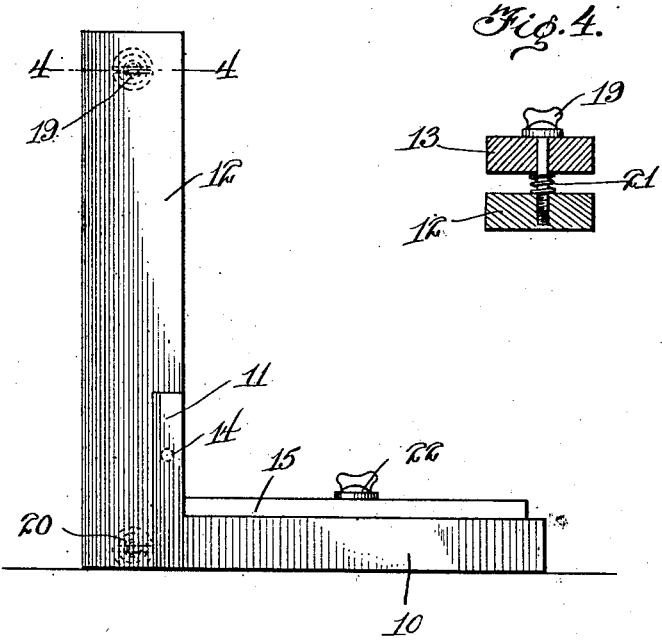
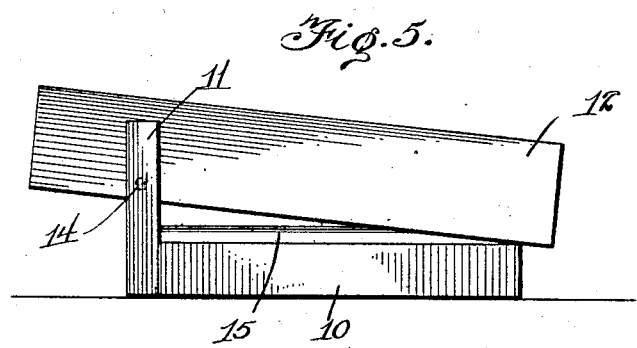
Witnesses
Inventor
Thomas H. Marcott
By Richard B. Owen,
Attorney

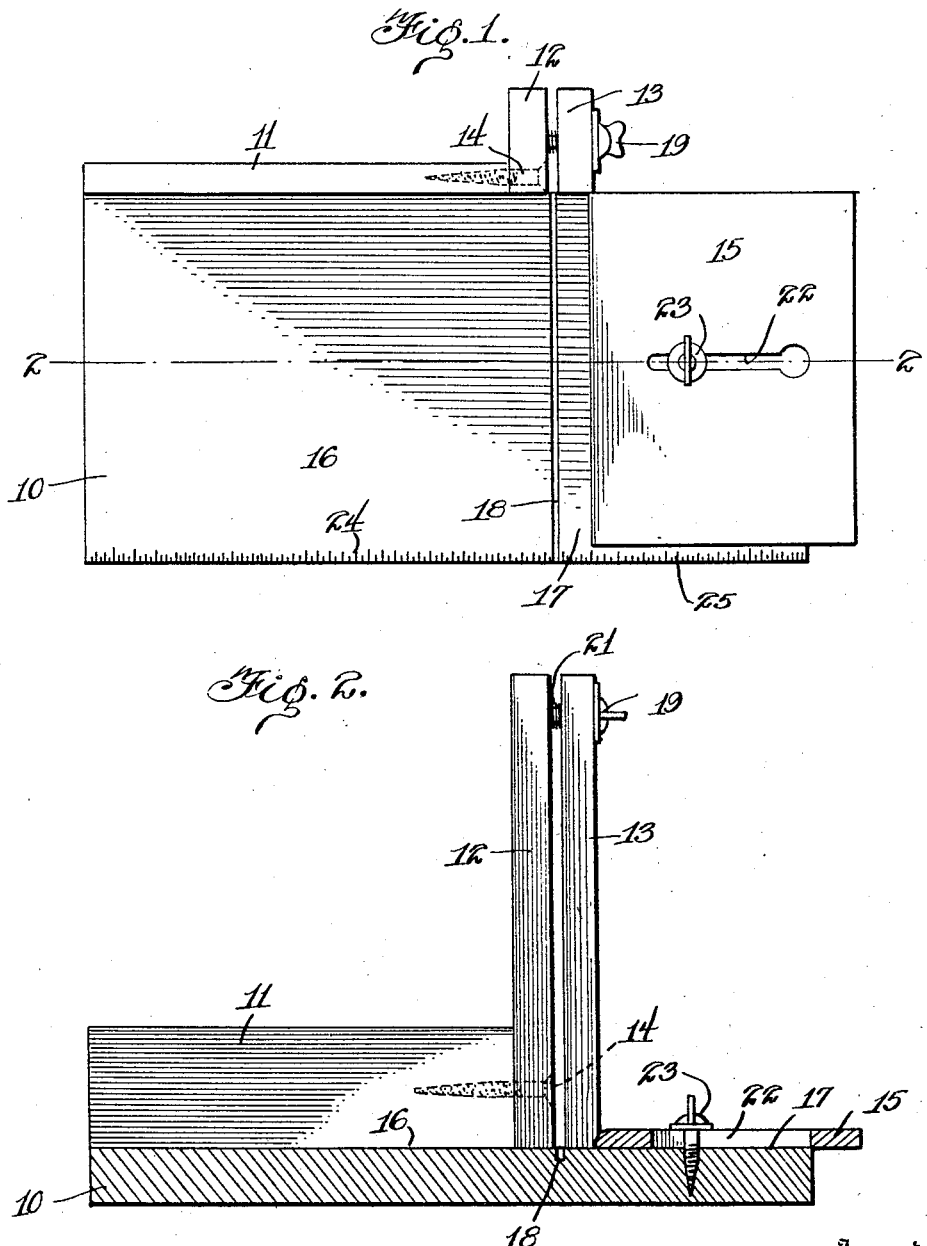

UNITED STATES PATENT OFFICE.

THOMAS H. MARCOTT, OF STAMFORD, CONNECTICUT.

BREAD-BOARD.

1,159,695.  Specification of Letters Patent.  Patented Nov. 9, 1915.

Application filed August 27, 1914. Serial No. 858,938.

*To all whom it may concern:*

Be it known that I, THOMAS H. MARCOTT, citizen of the United States, residing at Stamford, in the county of Fairfield and State of Connecticut, have invented certain new and useful Improvements in Bread-Boards, of which the following is a specification.

This invention relates to bread boards, and more particularly relates to such devices of this type which are adapted to serve as a guide for the cutting or slicing of the bread.

As a principal object, this invention contemplates the provision of a bread board which shall combine in one simple device means for guiding an operator's knife so that he will be enabled to cut slices of a uniform size and means rendering such guiding means adjustable at the will of the operator to cut slices of different thicknesses.

It is a further object to provide a cutting board of this described type so constructed as to be readily foldable when it is desired to ship or carry the same while occupying the minimum space.

The above and additional objects are accomplished by such means as are illustrated in the accompanying drawings, described in the following specification and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts: Figure 1 is a plan view of the bread board comprehended by this invention, Fig. 2 is a front elevation of the device with parts being shown in section on the line 2—2 of Fig. 1, Fig. 3 is an end elevation of the board, Fig. 4 is a sectional view taken through the knife guides on the line 4—4 of Fig. 3, and Fig. 5 is a view similar to Fig. 3 but showing the parts in their folded position.

Before proceeding with the description of the drawings, it is desired to emphasize the fact that although this invention has been designed with particular reference to the slicing of bread as has been illustrated and will be hereinafter described in that connection, it nevertheless may be used with equal readiness to insure uniform slicing of cake, vegetables, meat or the like in which a uniform slice of a predetermined thickness is a desideratum.

Proceeding now with the description of the drawings, there is illustrated a bread board which is at present the preferred embodiment of this invention and which comprises mainly a base board 10, an upstanding guide 11 secured along one edge of the base board, a pair of foldable knife guides 12 and 13 pivoted as at 14 to the guide 11 in such a manner as to have one longitudinal edge abutting the base board and a slidable gage 15, together with certain features of adjustability which will be hereinafter more particularly detailed.

The base board 10 is rectangular in shape and of the thickness illustrated and is subdivided into two portions 16 and 17 by a transverse notch 18 which is alined with the guides 12 and 13. Upper and lower adjusting screws 19 and 20 connect these guides and there is interposed between them any suitable expansible resilient means 21 which surround the shank of the set screws and serve to maintain the guides 12 and 13 in the spaced relation to each other determined by proper manipulation of the adjusting means 19 and 20. The portion 17 of the base board has slidably mounted thereon the gage 15 which is slotted as at 22 in order to receive the set screw 23 appropriately positioned therein and extending into the base board. A suitable scale is provided for each of the portions 16 and 17 of the base board 10, such scales being designated by the numerals 24 and 25 respectively.

In operation with the board positioned as in Figs. 1, 2 and 3 the gage 15 is suitably positioned upon the portion 17 of the base board in order to determine the thickness of the slice to be cut by the distance between the inward transverse edge of the guide and the groove 18, and is held in such position by a proper tightening of the set screw 23. The guides 12 and 13 are then properly positioned to accommodate the thickness of the operator's knife by means of the described set screws 19 and 20, the latter of which, it should be noted, being positioned below the top surface of the base board 10 so as not to interfere with the downward cutting action of the knife. The bread or other article to be cut is slid longitudinally of the portion 16 and pressed by one of the operator's hands against the gage 11, and the inner transverse edge of the guide 15. The operator then has but to insert the point of his knife between the knife guides 12 and 13 and to bring the edge of the knife down in the usual slicing manner, the visible portion of the slot 18 serving as a guiding line for the rear portion of the knife, thus insuring the production of uniform slices as long as the setting of the slotted gage 15 remains unchanged. The scale 25 is of course designed for use when the slotted guide is set enabling the operator to determine the thickness of each slice, while the scale 24 as will readily be obvious renders the ascertainment of the number of slices cut in a loaf of given length easily possible by merely reading on the scale the length of the loaf before commencing the slicing operation and then afterward counting the number of slices.

While in the foregoing however, there has thus been illustrated in the drawings and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. In a bread board, the combination with a base board, of a fixed bread guide extending along one edge of said board, and a pair of knife guides resiliently separated and pivoted to first said guide.

2. In a bread board, the combination with a base board, of a bread guide fixed to one edge of said board, a knife guide pivoted to said bread guide for erect or folding position across said board, a similar knife guide, means adjusting the distance between said guides, and resilient means maintaining said guides in the adjusted position.

3. In a bread board, the combination of a fixed guide extending along one edge of said board, of a knife guide, means pivotally mounting said knife guide to said fixed guide to render the same foldable over said board or in erect abutting relationship thereto, a similar knife guide spaced from first said knife guide, adjusting screws connecting said guides at their extremities, the lowermost of said screws being positioned below the surface of said board, and resilient means normally separating said guides to the limit of their adjusted position.

In testimony whereof I affix my signature in presence of two witnesses.

THOMAS H. MARCOTT.

Witnesses:
EDWARD F. BOWEN,
EDW. FARRINGTON.